Feb. 2, 1937.   A. N. EMMONS   2,069,701
AUXILIARY POWER OPERATED DEVICE FOR MACHINE TOOLS
Filed Aug. 20, 1934   3 Sheets-Sheet 1
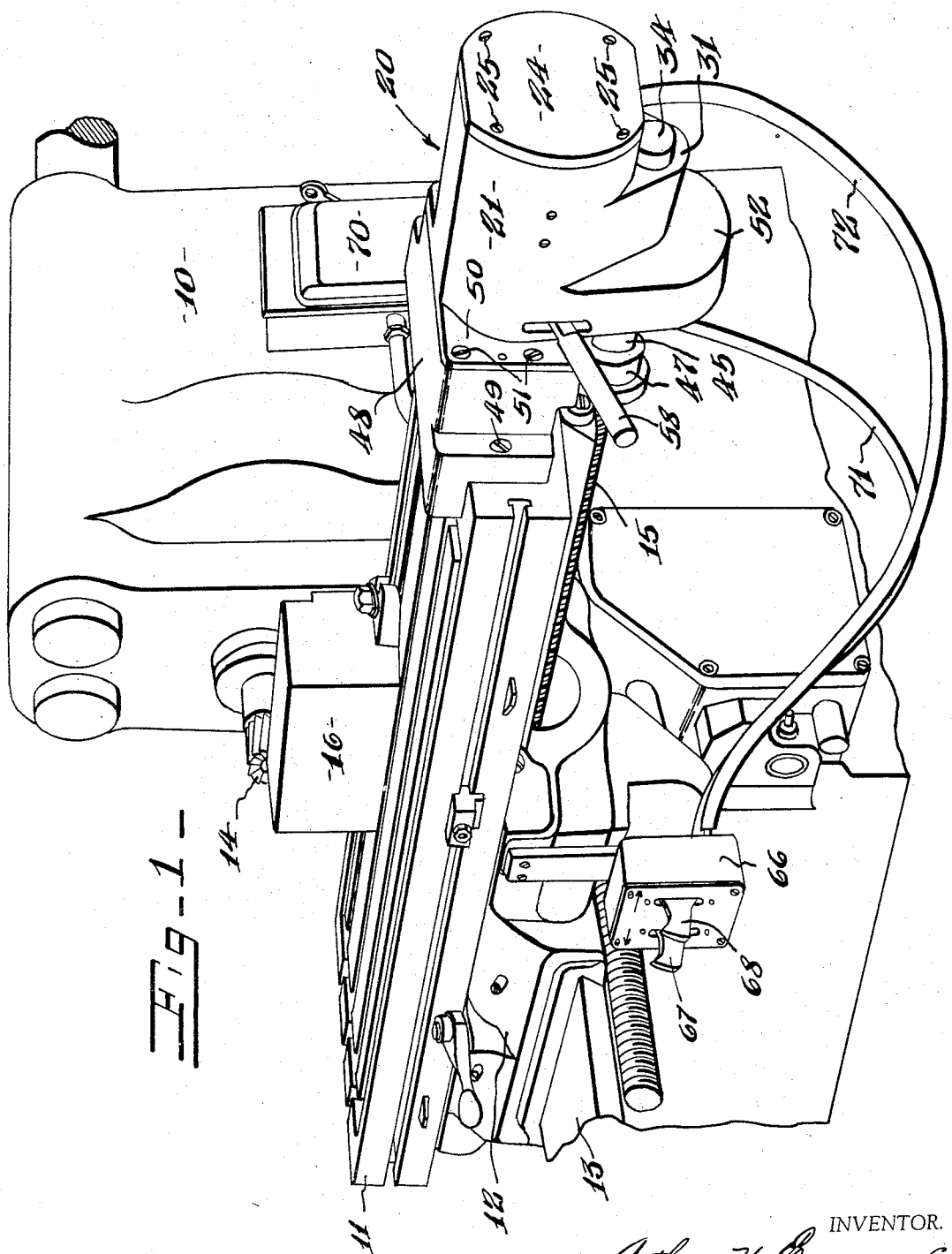
INVENTOR.
Arthur N. Emmons
BY Bordell & Thompson
ATTORNEYS.

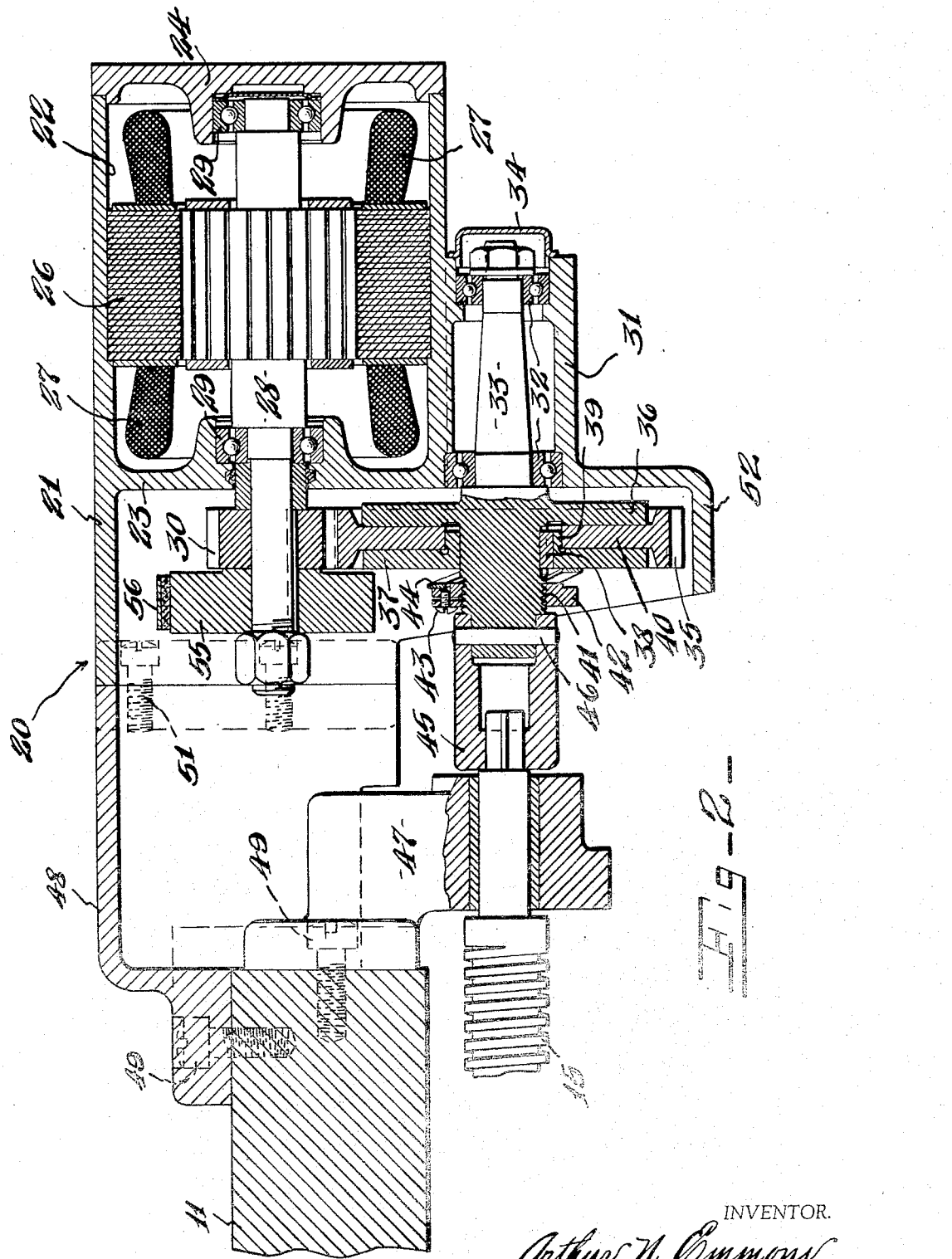

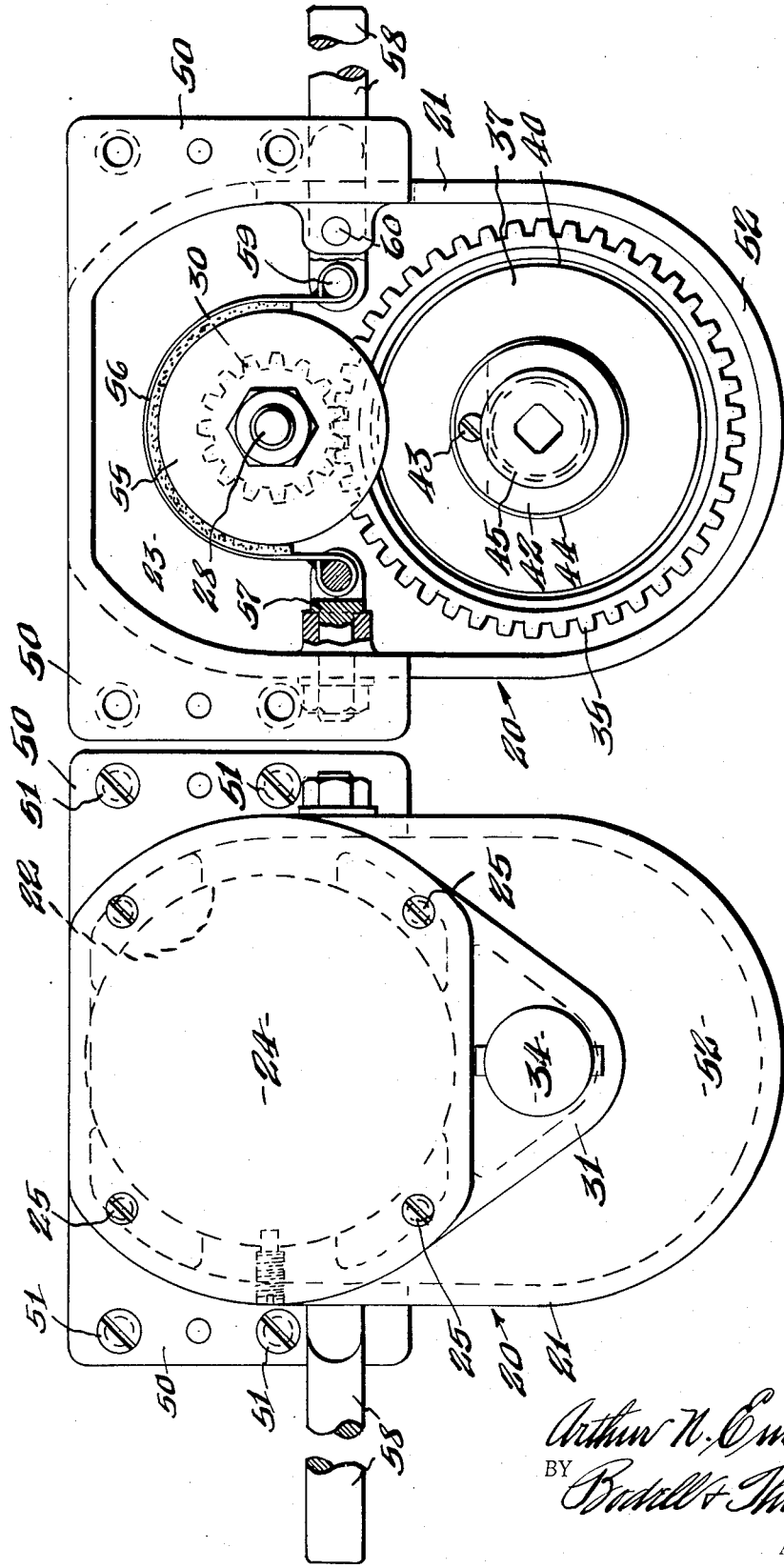

Patented Feb. 2, 1937

2,069,701

UNITED STATES PATENT OFFICE 2,069,701

AUXILIARY POWER OPERATED DEVICE FOR MACHINE TOOLS

Arthur N. Emmons, Nedrow, N. Y., assignor to The Porter-Cable Machine Company Inc., Syracuse, N. Y., a corporation of New York Application August 20, 1934, Serial No. 740,619

4 Claims. (Cl. 90—21)

This invention relates to mechanism for effecting and controlling the movement or operation, at comparatively high speed, of movable elements on machine tools and the like. More particularly the invention relates to a detachable auxiliary power operated unit which may be readily applied to movable elements of standard machine tools, such as work tools, and is so connected with the operating mechanism thereof that movement of the table at high speed is effected through the medium of power, and under the direct control of the operator.

An object of the invention is a device of the kind referred to so constructed that it may be readily and easily applied to the work tables of machine tools now in use, and also a device which, in some instances, is interchangeable with the usual hand crank, or one of the usual hand cranks for operating the feed screw.

A further object of the invention is such a device so constructed that the operating parts and power unit are self contained and accordingly operate with the maximum of efficiency, and also a unitary device which is easily applied to the machine tool.

A further object of the invention is a device of the class referred to by which very small or maximum movements of the table of the machine tool are quickly and accurately effected without any appreciable effort, or consumption of time, on the part of the operator.

The invention consists in the novel features and in the combinations and constructions hereinafter set forth and claimed.

In describing this invention, reference is had to the accompanying drawings in which like characters designate corresponding parts in all the views.

Figure 1 is a partial perspective view of a machine tool with the power unit secured to the table thereof.

Figure 2 is a longitudinal, sectional view of the power unit together with a contiguous portion of the work table to which it is attached.

Figure 3 is an end elevation of the power unit, looking to the left Figure 2.

Figure 4 is an end elevation, partly in section, looking to the right Figure 2.

10 designates generally a machine tool, and as shown in Figure 1 of the drawings consists of a milling machine with the usual work table 11 supported on a saddle 12 which, in turn, is carried by a knee 13 which is movable vertically. The saddle 12 is movable on the knee 13 toward and from the body of the machine, or the cutting tool 14. The table 11 is movable at right angles to the movement of the saddle 12, which movement is effected by rotation of the screw 15 carried by the table and threading into a suitable nut, not shown, carried in the saddle 12.

Suitable means is provided whereby the operator may effect rotation of the screw 15 and slow movement of the table 11 by means of the power actuating the cutting tool 14.

16 designates a piece of work secured to the table 11. As indicated in Figure 1, the table has been moved to the left and the work 16 passed in engagement with the cutter 14, and the table returned to the right. If further milling of the work is required, the knee 13 may be elevated, or the saddle 12 moved inwardly toward the cutter, and the table 11 again moved to the left and another cut taken on the work 16. The construction and operation of the milling machine above described forms no part of this invention per se.

This invention has to do with a power operated device for effecting movement of the table 11 at high speed. Uusually, the screw 15 is provided at one, or both, ends with a suitable crank, or hand wheel, whereby the screw may be rotated manually. It is to be understood that when the screw 15 is operated by the power feed of the machine tool, it is operated at a comparatively slow speed, as it is necessary to pass the work 16 very slowly into engagement with the cutter 14. After a cut has been taken, the operator releases the power feed on the screw 15 and returns the table by hand manipulation of the screw 15 in order to avoid the delay that would result in reversing the power application to the lead screw 15. The operator then removes the work 16 and secures another piece on the table and rotates the screw by hand until the work is brought into close proximity to the cutter 14, then the regular power feed is connected to rotate the screw 15 to move the table and work past the cutter.

On large machine tools the work tables weigh several hundred pounds. Often the work itself will weigh one hundred or more pounds, all of which results in the necessity of the application of a considerable amount of energy on the part of the operator to move the table and work by hand. Also, a considerable amount of time is consumed by the operator in walking to the end of the table and turning the screw 15 to return the table to its initial position after having passed the work by the cutter. Further time is consumed by the operator in again walking to the end of the table and rotating the screw 15 to bring the work into close proximity to the cutter. Obviously, where the machine is used constantly, as on production work, a considerable amount of unproductive time is thus consumed, and in addition the operator becomes fatigued and the production of the machine decreases during the working day.

The general object of this invention is a small compact, rigid power unit manually controlled by the operator, and in operation obviates the necessity of the operator manually returning the table to loading position after a cut has been taken, and also moving the table with the work in proximity to the cutter preparatory to taking a new cut. Obviously, the saving of time thus effected is very appreciable.

The invention consists generally of a power unit provided with means for connection to the operating screw of the work table, and a bracket for attaching the power unit to the work table. The power unit includes an electric motor, a driven shaft connected to the operating screw of the table, and motion transmitting means between the motor shaft and the driven shaft, and also includes a unitary attachment in which the mechanism includes an electric motor, motion transmitting means operated by the motor including an overload clutch and a coupling for connecting the motion transmitting mechanism to the feed screw, all of which parts are all enclosed within a bracket in the form of a housing which is readily attachable to the machine tool, the housing protecting the mechanism within it against dust, chips, etc.

20 designates generally the power unit. As here shown, it includes a housing 21 which is provided with a cylindrical bore 22 which is closed at the inner end by a partition 23, and on the opposite or outer end by a detachable cap or cover 24 secured to the housing by screws 25. The bore 22 is machined to receive the field laminations 26 of an electric motor, here shown as an induction motor provided with windings 27 so formed as to effect either forward or reverse rotation of the rotor and motor shaft 28. The motor shaft 28 is suspended in suitable antifriction bearings 29 located in the partition 23 and end cap 24 with the shaft extending through the partition 23, and is provided with a pinion gear 30 suitably keyed thereto. The housing 21, as here shown, is provided with an integral depending portion 31 in which suitable antifriction bearings 32 are mounted in spaced apart relationship, and which support a driven shaft 33.

34 designates a dust cap which acts as a closure for the outer end of the bore of the depending portion. The driven shaft 33 extends parallel to the motor shaft 28 and projects inwardly beyond the plane of the partition 23. A gear 35 is mounted upon the projecting portion of the shaft 33 and meshes with the pinion gear 30 on the motor shaft 28. The gear 35 may be formed integral with the shaft 33, or keyed thereto in any suitable manner. However, I have found it desirable to provide a yielding connection between the motor shaft 28 and the driven shaft 33. As here shown, the projecting portion of the shaft 33 is formed, or provided, with a disk 36 which is integral with the shaft 33, or secured thereto, and rotatable therewith. A second disk 37 is slidably mounted upon the shaft 33 and keyed thereto as at 38. The disk 37 is provided with a short hub portion 39, and the gear 35 is provided with a disk web portion 40 which is arranged between the disks 36, 37, and is provided with a central bore to receive the hub 39 of the disk 37.

The shaft 33 is threaded, as at 41, to receive an adjustment nut 42 which is provided with a suitable locking means as at 43. A spring washer 44 is inserted between the nut 42 and the slidable disk 37. Obviously, the frictional contact between the gear 35 and the disks 36, 37, may be varied by adjusting the nut 42.

The driven shaft 33 is connected to the outer end of the table screw 15. As here shown, the shaft 33 is provided with a suitable connection 45 being secured to the shaft 33 by a pin 46. The outer end of the connection 45 is provided with a square aperture to receive the squared end of the screw 15. It is to be understood that the projecting ends of the screw 15 are usually squared to receive the crank, or hand wheel, for manually manipulating the screw, in which instance, the hand wheel, or crank, is removed from the screw and is replaced by the connection 45. However, the connection 45 may be secured, in any suitable manner, to the end of the screw 15. The table screw 15 is supported by suitable bearing brackets 47 which are secured to the ends of the work table 11.

Obviously, upon rotation of the motor shaft 28, such rotation is transmitted to the screw 15, through the gears 30, 35, disks 36, 37, driven shaft 33, and connection 45. The structure thus far described may be designated as the power unit of the device. This power unit is secured to the end of the work table 11 by means of a suitable support or bracket 48. The bracket 48 is secured to the work table by screws 49. The housing is provided with a rectangular flange 50 which is secured to the bracket by screws 51.

The structure thus far described consists of a power unit which is entirely self contained and which, by means of the bracket 48, may be readily attached to the work table of any machine tool without necessitating the adjustment or fitting of any of the parts of the power unit and accordingly, eliminating the possibility of getting the working parts of the power unit out of alinement, and decreasing the efficiency thereof. The power unit described is suitable for practically all types of machine tools. The only adjustment necessary in attaching the device to the machine tool consists in fitting the bracket 48 to the machine. Generally, there is little variation in the construction of work tables on a particular class of machine tools, such as milling machines. However, if there be any variation, for example, a variation in the distance between the center of the screw 15 and the surface of the table 11, the same is compensated for by machining more or less off from the inner end of the bracket 48. However, no attachment is necessary in the power unit per se. This feature is of importance inasmuch as it permits ordinary mechanics to quickly attach the device in proper manner to the work table, and without tampering in any way with the construction of the power unit.

The housing 21 is also provided with a depending arcuate portion 52 which serves as a housing for the gear 35 and the associated clutch mechanism.

I have found, in some instances, that it is desirable to provide the device with means controlled by the operator whereby he may instantaneously stop any movement of the work table 11. Such a means is desirable where the operator wishes to quickly move the table and work up to close proximity to the cutter preparatory to engaging the cutter with the work. As here shown, a disk or drum 55 is secured to the projecting end of the motor shaft 28. A manually operable brake band or shoe 56 is arranged to engage the drum 55. One end of the band 56 is secured to a stud 57 secured in the rear side of the housing 21, and the other end is secured to the inner end of a lever 58, as at 59. The lever 58 is pivoted in the front side of the housing as at 60, and projects outwardly through the side of the housing where it may be conveniently manipulated by the operator. When it is desired to instantly stop movement of the table in either direction, the operator pulls upwardly on the lever 58 which draws the brake band 56 into engagement with the disk 55.

As previously stated, the winding 27 of the motor is such as to effect reverse rotation of the shaft 28. The motor is controlled by a suitable switch 66 conveniently located within easy reach of the operator. As here shown, it is secured to the front side of the saddle 12 of the milling machine. The switch 66, here shown, is provided with a pair of manuals 67, 68. Operation of one manual causes the motor to operate in one direction and move the table, and operation of the other manual causes the motor to operate in reverse direction and move the table in the opposite direction. Any suitable reversing switch may be employed. The operating circuit for the motor, as here shown, is taken from the switch box 70, through cable 71, to the reversing switch 66 and thence, through cable 72 to the motor windings 27.

In use, the friction clutch of this device is so adjusted by the nut 42 that it has just enough tension to move the table without slipping. If the power feed is connected to the screw 15, or if the table is so moved by the device as to jar the work against the cutter the friction clutch will slip and not damage the machine, or stall the motor, and thereby seriously damage the windings of the motor.

What I claim is:

1. The combination of a machine tool having a movable work table with a feed screw operable to move said table and an auxiliary power operated device for operating said screw, said device including a housing formed with a motor compartment, a motor mounted in said compartment and having its rotor shaft extending through one end thereof, a driven shaft rotatably mounted in said housing, motion transmitting means connecting the motor shaft and the driven shaft including an overload clutch mechanism, a bracket detachably secured to one end of the table, said bracket acting as a support for the housing, and means connecting the driven shaft to the feed screw of the table.

2. The combination of a machine tool having a movable table with a feed screw for effecting movement of the table, and an auxiliary power operated device for operating the feed screw, said device including an integral housing, a motor mounted in said housing, a driven shaft mounted in said housing and operably connected with the feed screw of the table, gearing arranged between the motor shaft and the driven shaft for transmitting motion from the motor shaft to the driven shaft, a drum secured to the motor shaft and brake mechanism coacting with said drum, said brake mechanism being manually operable from the outside of the housing.

3. A unitary power operated appliance for a machine tool having a feed screw, said appliance comprising a casing provided with means for attachment to the machine tool, a motor mounted in the casing, a driven shaft rotatably mounted in the casing and arranged to come in axial alinement with the feed screw, and gearing arranged in the casing and connecting the motor and the driven shaft, said gearing including an overload clutch, and means for coupling the driven shaft to the feed screw, and a manually operable brake mechanism coacting with the rotor.

4. An auxiliary unitary power operated device for a machine tool having a work table and a feed screw for operating said table, said device comprising a casing, a shaft rotatably journalled in said casing, a bracket detachably supporting said casing on the work table with said shaft arranged in axial alinement with the table feed screw, the inner end of said shaft being coupled to the projecting end of the feed screw to effect rotation of said screw upon rotation of the shaft, a motor mounted in the casing, gearing arranged in the casing and operatively connecting the rotor shaft of said motor and said first mentioned shaft, and an overload clutch associated with said first mentioned shaft and operable when the torque between the rotor shaft of the motor and the feed screw reaches a predetermined value to permit relative rotative movement between the rotor shaft and the feed screw.

ARTHUR N. EMMONS.